Feb. 6, 1962 R. G. SCHRIEFER 3,020,537
AUTOMATIC TRACKING SYSTEM

Filed May 1, 1953 2 Sheets-Sheet 1

INVENTOR.
ROBERT G. SCHRIEFER
BY
Lockwood, Galt, Woodard, & Smith
ATTORNEYS

INVENTOR.
ROBERT G. SCHRIEFER

United States Patent Office 3,020,537
Patented Feb. 6, 1962

3,020,537
AUTOMATIC TRACKING SYSTEM
Robert G. Schriefer, Fort Wayne, Ind., assignor to International Telephone and Telegraph Corporation, a corporation of Maryland
Filed May 1, 1953, Ser. No. 352,508
5 Claims. (Cl. 343—7.4)

The present invention relates to an automatic tracking system for use on a moving vehicle such as an automobile, a ship or an air-borne craft. The system may be used to track distant objects (targets) or it may be used to pilot such a vehicle.

In such a system, at any instant, a change in directional or positional operation may be required for two reasons:
 (a) The target may move; or
 (b) The system may itself be acted upon by extraneous forces (ship rolling, aircraft maneuvering, etc.) which throw it instantaneously out of the proper direction that must be restored.

It is characteristic of the condition "a" that only slow and gradual changes will be demanded, while the changes of condition "b" tend to be sudden or jerky and should be counteracted quickly.

The following description is based on the case of an aircraft tracking a relatively moving target, but it is to be understood that the invention applies also to other kinds of equipment.

In air-borne tracking systems which serve to follow the direction of movement of a selected object, radar equipment provided with universally movable beam antennas are commonly utilized. In general, such antennas have two degrees of freedom, one being in an azimuthal direction and the other being in an elevational direction. In order to maintain the antenna directed toward the followed object, it is usually necessary to utilize a gyroscopic instrument which serves dual purposes of (1) stabilizing the antenna on an object and (2) of indicating the spatial slewing rate of the antenna. By stabilizing the antenna onto the object, a "line of sight" direction toward the object is constantly maintained. The detection and measurement of the slewing rate is a factor which may be utilized in obtaining navigational information.

Various systems for automatically positioning an antenna have been proposed, and one class of such systems utilizes an arrangement wherein the stabilizing gyroscope is physically mounted on the antenna. In such system, the gyroscopic instrument provided information indicating the rate of target deviation, the antenna being kept on the target by means of auxiliary radar apparatus. Certain difficulties well known to the art were encountered with this particular system of antenna-mounted gyros which are overcome by use of the present invention.

The fundamental concept of this invention provides a gyroscopic instrument for use in combination with a universally movable antenna which is physically separated from the latter and which serves to stabilize the antenna as well as to provide the rate of target motion. In accomplishing this in aircraft, the gyroscope is mounted remote from the antenna which is mounted toward the front in a suitable location. The gyroscopic instrument is actually composed of a pair of orthogonally related, single-degree-of-freedom gyroscopes mounted on a common gimbal platform with the two gyroscope spin axes being perpendicular to the platform. The platform and antenna are intercoupled to move correspondingly, the antenna movement being slave to that of the platform. Information received by the antenna is suitably fed to this instrument to cause it to move in a direction to follow the moving target. The instrument in turn supplies information for orienting the antenna in line with the target and during this orientation to provide the aforementioned rate information.

It is, therefore, an object of this invention to provide an automatic tracking system of the type described.

It is another object of this invention to provide an automatic tracking system wherein the antenna is universally movable and is controlled by a gyroscopic instrument physically separated therefrom.

It is another object of this invention to provide an automatic tracking system which serves to produce, in addition to the function of the preceding object, the operation of maintaining the antenna on target while simultaneously producing information indicating the rate of angular motion of the target in free space.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
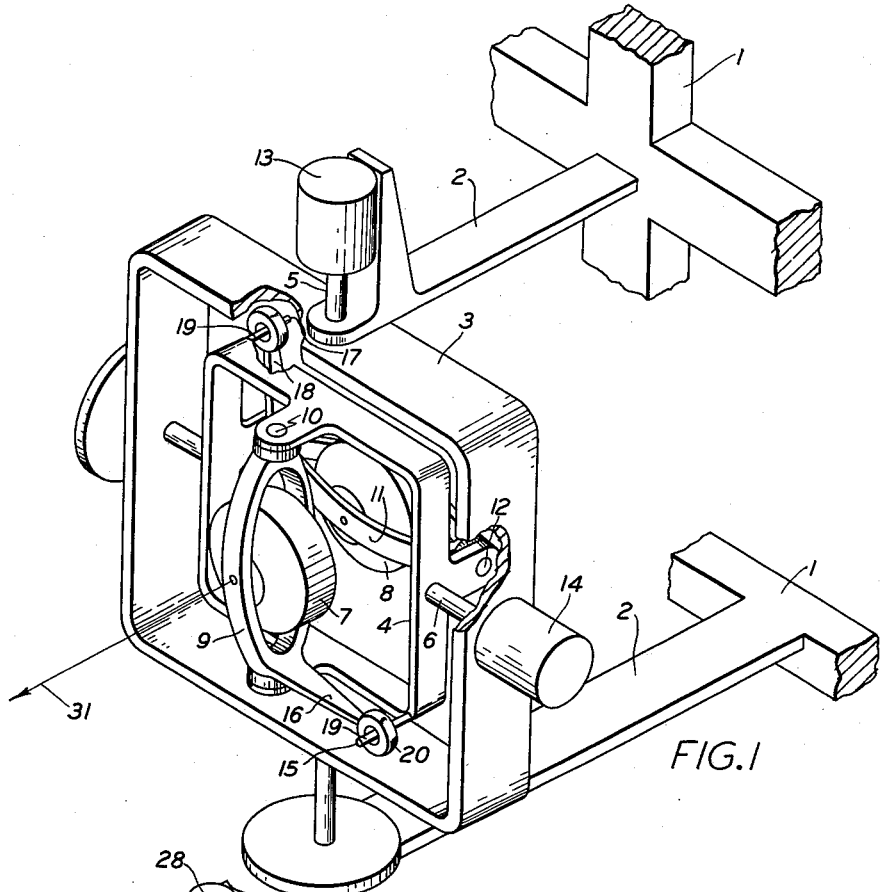
FIGURE 1 is a perspective illustration in diagram form of a gyroscopic instrument which may be used in an embodiment of this invention.

Referring to the drawings, and more particularly to FIGURE 1, the gyroscopic instrument is illustrated as being mounted in an airplane, the frame structure indicated by the reference numeral 1 being the stationary air-frame. Between two posts 2 on the air-frame is journaled a gimbal or platform 3, and a similar gimbal or platform 4 is journaled within the outer platform 3. These two platforms 3 and 4 are swingable about orthogonally related shafts 5 and 6, respectively, for a purpose which will become apparent hereafter. Within the inner platform 4 is mounted two single-degree-of-freedom gyros constituted by two oppositely rotatable wheels 7 and 8, respectively. A gimbal frame 9 swingable about an axis 10 on the inner platform 4 supports the wheel 7 for rotation about an axis perpendicular to the plane of the platform 4, while a substantially identical gimbal 11, which is swingable about a pivot 12 also on the platform 4, carries wheel 8 for rotation about an axis perpendicular to the platform 4. These physical relationships are true when the instrument is operating and stabilized. Otherwise, the various parts are free to pivot to random positions. The two gimbal pivots 10 and 12 are also orthogonally related, the axis 12 being always parallel to the inner platform axis 6.

Suitable conventional position-indicating or transmitting synchro devices 13 and 14 of the type having relatively rotatable parts and which serve to provide electrical information corresponding to the degree of angular deviation between such parts are utilized in sensing the respective positions of the two platforms 3 and 4. Synchro device 13 is suitably supported on one airframe post 2 and is operatively connected to the outer platform shaft 5 for measuring deviation between platform 3 and post 2. A similar synchro 14 serves to measure the angular deviation between the inner platform 4 and the outer platform 3 by means of operative connections therewith, one movable part of the synchro, such as the casing, being secured to the platform 3 and the other relatively movable part being rotatable with the shaft 6.

Devices for applying torque to the two gimbal structures 9 and 11, respectively, are mounted on the inner platform 4 as illustrated. The torque-applying device or motor 15 is operatively connected by means of an arm 16 to the gimbal 9 for torquing the latter about its axis 10. Similarly, another motor 17 is suitably connected to an operating arm 18 attached to the gimbal 11 for torquing the latter about its axis 12. These motors 15 and 17 may each comprise a simple bar magnet 19 which is secured to the gimbal frame 4 and about which a coil 20 is positioned. By applying a D.C. voltage to this coil 20, it will tend to move longitudinally of the magnet 19 in a direction corresponding to the sense of magnetic polarities between the coil and the magnet.

The instrument thus far described may be considered as comprising two individual gyros which are separately operable. These gyros are so arranged that one will provide elevational information whereas the other provides azimuthal information. Further with respect to the relationship between the two gyro assemblies 9 and 11, it is of importance that the spin axes of the two wheels 7 and 8, respectively, extend in the same direction. These axes may be either collinear or parallel.

Figure 2:
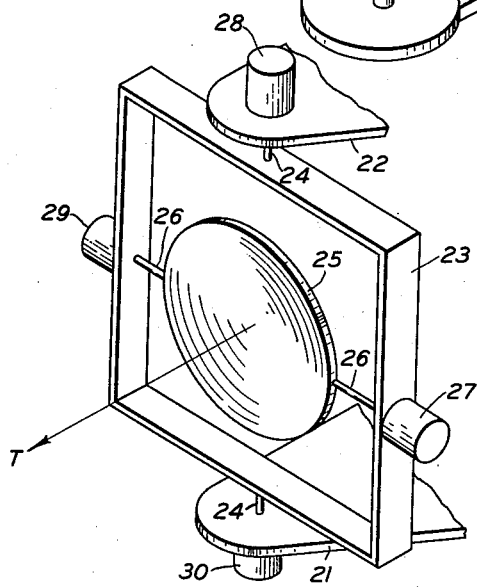
FIGURE 2 is a similar illustration of a radar antenna.

Referring now to FIGURE 2, the mounting arrangement of the target position-sensing device or antenna will be described. Between two suitable airframe supports, indicated by the reference numerals 21 and 22, respectively, is mounted a gimbal frame 23 for rotation with a vertical shaft 24 suitably journaled in these supports 21 and 22. It is of importance to note at this point that the axis of this shaft 24 must be parallel with the axis of shaft 5 of the instrument illustrated in FIGURE 1. In the present instance, these axes may be considered as being vertically aligned.

A dish radar antenna 25 of conventional design is supported by means of a horizontally extending shaft 26 for rotation with respect to the vertical side members of the gimbal frame 23. A synchro instrument or signal-comparison means 27 having one movable part secured to the gimbal 23 and its other part fastened to the shaft 26 may be similar or identical in construction to the previously described synchro devices 13 and 14, respectively. Another synchro instrument 28 is mounted between the airframe support 22 and the shaft 24 so as to measure the angular relationship therebetween. A motor 29 is mounted on the gimbal frame 23 for rotating the antenna 25 to a selected position, and another motor 30 supported on the airframe support 21 serves to rotate the shaft 24 for positioning the gimbal frame 23.

Figure 3:
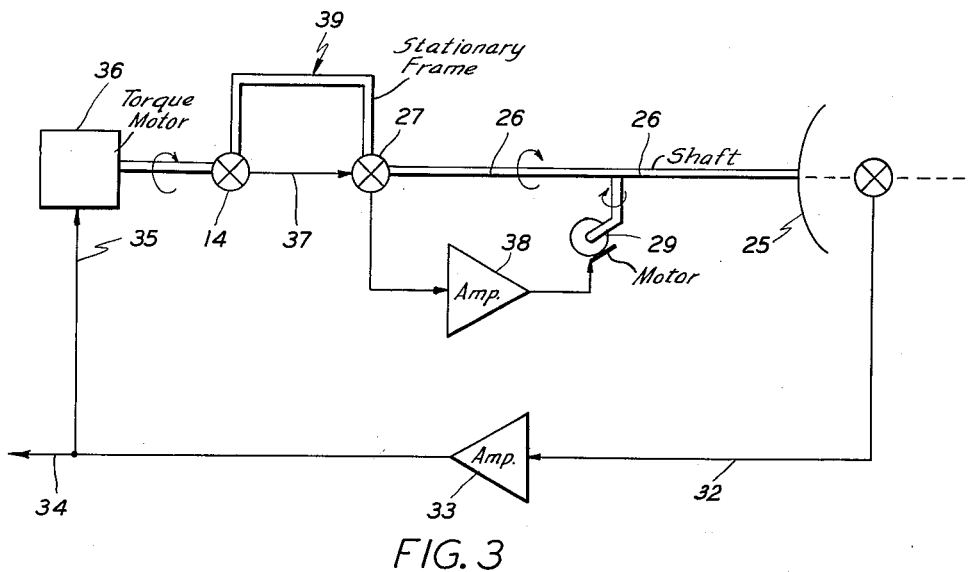
FIGURE 3 is a servo diagram illustrating an embodiment of this invention.

A system which incorporates the gyroscope antenna mechanism of FIGURES 1 and 2 is shown in FIGURE 3, but it should be understood that for a complete installation, two such systems as indicated in FIGURE 3 will necessarily be used, one system being for azimuthal control and the other system being for elevational control. Generally, the azimuthal system will be operatively coupled to the torque motor 17 of FIGURE 1 while the elevational system will be operatively coupled to the torque motor 15 of FIGURE 1. Also, as will be explained more fully hereinafter, each system comprises two servo loops, one loop being of relatively high bandwidth in response and the other being of low bandwidth.

In general, with the system stabilized in operation, the beam direction of the antenna 25 will be in parallel alignment with the spin axis, indicated by the reference numeral 31 in FIGURE 1, of the two, preferably counter-rotating, gyros 7 and 8, respectively. In achieving this alignment, the antenna 25 is forced to track the target. If the antenna is off the target, an error signal is produced by the antenna 25 and associated radar equipment, which may be used as a measure of the angle between the axis of the antenna 25 and the target. This signal is coupled by means of a line 32 into a suitable electronic amplifier 33 which detects and transforms this error signal into a direct current potential. Radar equipment for producing this error signal is conventional and a suitable system may be found in Volume 25 of "Theory of Servo Mechanisms" by James, Nichols and Phillips in the "M.I.T. Radiation Laboratory Series." In such a system, the greater the deviation between the antenna axis and the target, the greater is the amplitude of the error signal. Since this error signal is utilized to actuate the gyro 9, 11 and since the angular velocity of the platform 4 (in following the target) is proportional to this signal, the error signal becomes a direct measurement of the rate of angular target movement which may be utilized by computing devices for obtaining navigational information. For such utilization the output voltage (rate information) of the amplifier 33 may be conducted by means of a line 34 to suitable computing devices or indicators.

This same error voltage from the amplifier 33 is coupled by means of a line 35 to, for example, the elevation torque motor 15 of the elevation gyro 9 (FIGURE 1), indicated in FIGURE 3 by the reference numeral 36. This D.C. voltage applied to the motor 15 torques the gimbal arm 16 tending to rotate the latter about its pivot 10. The wheel 7 thereupon precesses causing movement of the gimbal platform 4 about its axis 6. Displacement in the synchro device 14 follows, which produces a signal corresponding to such movement. This signal from synchro 14 is conducted by means of a line 37 to the synchro instrument 27 (FIGURE 2) of the antenna assembly. The receiving synchro 27 thereby operates in conjunction with the transmitting synchro 14 to produce a control signal which is a measure of the angular displacement between the rotary parts of the two synchros, or, in other words, a measure of the spatial difference in the positions of the antenna and platform 4. This signal is fed to an amplifier 38 which produces a potential of sufficient magnitude for driving motor 29 in a direction corresponding to the relative displacement between the two synchros 14 and 27. Motor 29 thereupon rotates the shaft 26 and antenna 25 until the synchro 27 is brought into alignment with the synchro 14 whereupon the signal produced by the synchro 27 reduces to zero. When this occurs, the elevational position of the antenna 25 corresponds identically to that of the position of the platform 4 (in FIGURE 1).

The particular operation of the gyro 9, 11, as explained in the foregoing, is effected by reason of the fact that the gyro acts as an integrator of the error signal delivered by the amplifier 33. The gyro is accurately calibrated to transform proportionally this error signal into gyro rates as determined by the requirements of the system.

Another system identical to the one just described in FIGURE 3 will be connected to the azimuth torque motor 17 (FIGURE 1) and cause positioning movement of the gimbal frame 23 (FIGURE 2) in a corresponding manner, this frame 23 following the movement of gyro platform 3. Thus by utilizing both azimuthal and elevational stabilizing control, a target may be actually spotted and faithfully tracked.

The torque of precession delivered by the respective gyros 9 and 11 will corresponding directly to the error information originated by the antenna 25 and amplified by the amplifier 33.

This error signal causes motion of the gyro spin axis 31, and the gyro 9, 11 in turn causes the same motion of the antenna as described. The system is designed to operate with an error signal small in magnitude with reference to the actual angular deviation between the target and antenna beam. Further, the motion of the gyro spin axis and the corresponding motion of the antenna beam is caused to be a near reproduction of target angular motion. The gyro 9, 11 is calibrated to precess at angular rates accurately proportional to the precessing signal (from amplifier 33) applied, and since by the nature of the system, the gyro continually reproduces target angular motions very accurately, the precessing signal constitutes an accurate measure of target angular rates (as explained previously). The gyro precession is a function of inertial space without reference to airframe positions, and the angular rates measured are with reference to free inertial space.

As mentioned previously, the spin axis, indicated by the reference numeral 31 (FIGURE 1) of the gyro instrument, will at all times be parallel with the axis of the antenna 25, and furthermore, will be constantly directed toward the followed target.

It is well known that the error signal coming from the antenna contains considerable "noise" which must be eliminated to obtain smooth operation of the entire system. In reducing or eliminating such noise, the bandwidth of the error channel (32, 33, 35 in FIGURE 3) should be as small as feasible, such as, for example, between ½ and 1 cycle per second. This means that sudden or quick changes in the target motion will not be detected, but such changes rarely, if ever, occur in the case of the target being an airplane or rocket.

But quite violent fluctuations of the aircraft which carries the system may occur. Since the gyro axis 31 maintains its position in inertial space, it will suddenly change its position relative to the aircraft and thus cause the generation of a signal. All the system parts between the torque motor 15, 36 and the antenna 25 in FIGURE 3 must thus be able to transmit high bandwidth signals of the order of 10 cps., so as to reset quickly the antenna. This means that the antenna loses its proper direction for an instant, but regains it after a few tenths of a second. The radar error signal during this short time will not be passed by the low bandwidth channel 32, 33, 35, so that these sudden jerks will be absent from the rate information at 34. These bandwidth features are desirable, and the possibility of splitting the system into two branches or servo loops of very different bandwidths is an important advantage of the invention.

In FIGURE 3, the high bandwidth loop comprises the elements 14, 27, 38, 29, the feedback arm being actually constituted by the rigid airframe, indicated by the reference numeral 39, of the transporting aircraft. The two synchros 14 and 27 are both secured to this airframe so in determining performance, both may be considered to have the same stable reference from which deviation may be measured. The low bandwidth loop, therefore, includes components 25, 32, 33, 35, 36, 14, 27, 38, 29 and 26 and the high bandwidth loop includes components 14, 37, 38, 29, 26 and 39.

The gyroscopic instrument is designed to respond almost instantaneously to sudden movements of the transporting aircraft whereupon correspondingly instantaneous signals indicating this movement are produced by the two synchros 13 and 14, respectively. These signals, being referenced against the airframe, are immediately utilized by the antenna synchros 27 and 28, respectively, for maintaining the spatial position of the antenna axis. By reason of this relatively quick reaction to sudden changes in airframe attitude, this part of the system is characterized as having relatively high bandwidth response.

While the gyro instrument of FIGURE 1 has been described in its most fundamental aspects, it will be understood by persons skilled in the art that certain conventional accessories or devices, such as precession-sensitive motors for operating the two frames 3 and 4, respectively, will be necessary in order to secure proper operation of the instrument.

By means of this invention wherein two counter-rotating gyros are mounted on orthogonally related gimbal frames, simplicity of design and operation of the overall system is achieved, with the additional advantage of providing a means for physically separating the gyro instrument from the antenna mechanism. In addition to this, the invention produces stabilized tracking of a target while simultaneously delivering rate information for use in computing travel characteristics of the target.

The word "position" has been used in explaining the operation and structure of the gyroscopic instrument and of the antenna, and by this word is meant the spatial attitude or orientation of the instrument or antenna parts as the spin axis 31 or antenna axis "T," respectively, are moved. The term "gyroscope position" is intended to refer to the spin axis orientation.

What is claimed is:

1. A system of the character described comprising radar sensing apparatus which includes a directional movable antenna and which produces an error signal corresponding to the deviation between said antenna and a target being tracked, a gyroscopic instrument comprised of a pair of orthogonally related single-degree-of-freedom gyros mounted on a single gimbal platform with the spin axes of said gyros perpendicular to the plane of said platform, a rigid frame, both said antenna and said instrument being carried in physically spaced relation by said rigid frame, torque means mounted on said platform and operatively coupled to one of said gyros for causing precessional movement of said platform upon actuation of said torque means, circuit means interconnecting said apparatus with said torque means for applying said error signal to the latter, said platform being movable to a position dependent upon the character of said error signal, a signal-generating device operatively connected to said instrument and generating a signal corresponding to the degree of movement of said platform, and position-comparing means operatively intercoupled between said antenna and said signal-generating device and responsive to the signal generated by the latter for causing said antenna to move in unison with said platform, said platform being moved in response to said error signal in a direction to reduce the deviation between said antenna and said target and to thereby produce a corresponding reduction in said error signal.

2. A guiding system comprising a single gyroscopic instrument which includes a pair of orthogonally related single-degree-of-freedom gyros mounted on a first platform with the spin axes of said gyros perpendicular to the plane of said platform, a second platform, a first pair of trunnions mounting said first platform on said second platform, a second pair of trunnions mounting said second platform on a stationary frame, the axes of said first and second pair of trunnions being orthogonally related, first and second torque devices mounted on said first platform and operatively coupled to said pair of gyros respectively, an antenna supported on two orthogonally related pivotal mountings for universal swivelling movement, said pivotal mountings being rotatable, one of said pivotal mountings being carried by said stationary frame, the respective axes of said pivotal mountings and said pairs of trunnions being parallel, a first pair of servo loops operatively coupled between and including one pair of trunnions and the parallel pivotal mounting, a second pair of servo loops operatively coupled between and including the other pair of trunnions and other pivotal mounting; each pair of loops comprising one high frequency responsive loop and one low frequency responsive loop; each low frequency loop comprising a first synchro operatively coupled to one of said trunnion pairs, a second synchro operatively coupled to one of said pivotal mountings, a motor also operatively coupled to the last-mentioned pivotal mounting, means electrically connecting said first synchro to said second synchro and said second synchro to said motor, error signal-generating means operatively coupled between said antenna and one of said torque devices; and each high frequency loop comprising the first synchro, the second synchro and the motor and said high frequency loop being responsive to the relative motion of said stationary frame.

3. A guiding system comprising a single gyroscopic instrument which includes a first platform, a pair of gyros each mounted on said platform by a single axis pivot structure, the spin axes of said gyros normally being perpendicular to said platform, the axes of said gyros being spaced apart in normal relation, a pair of torque devices on said platform operatively connected to said pivot structures respectively, a second platform, a first pair of trunnions mounting said first platform on said second platform, a second pair of trunnions mounting said second platform on a stationary frame, the axes of said first and second pair of trunnions being orthogonally related, an antenna supported on two orthogonally related pivotal mountings for universal swivelling movement, said pivotal mountings being rotatable, one of said pivotal mountings being carried by said stationary frame, the respective axes of said pivotal mountings and said pairs of trunnions being parallel, a first pair of servo loops operatively coupled between and including one pair of trunnions and the parallel pivotal mounting, a second pair of servo loops operatively coupled between and including the other pair of trunnions and other pivotal mounting; each pair of loops comprising one high frequency responsive loop and one low frequency responsive loop; each low frequency loop comprising a first synchro operatively coupled to one of said trunnion pairs, a second synchro operatively coupled to one of said pivotal mountings, a motor also operatively coupled to the last-mentioned pivotal mounting, means electrically connecting said first synchro to said second synchro and said second synchro to said motor, error signal-generating means operatively coupled between said antenna and one of said torque devices; and each high frequency loop comprising the first synchro, the second synchro and the motor and said high frequency loop being responsive to the relative motion of said stationary frame; one of the first synchros being operatively connected between said first pair of trunnions and said second platform, the other of said first synchros being operatively connected between the second pair of trunnions and said stationary frame, one of the second synchros and one of said motors being operatively connected to one pivotal mounting, and the other of said second synchros and the other of said motors being operatively connected to the other pivotal mounting and to said stationary frame.

4. A guiding system comprising a single gyroscopic instrument which includes a pair of orthogonally related single-degree-of-freedom gyros mounted on a first platform with the spin axes of said gyros perpendicular to the plane of said platform, a second platform, a first pair of trunnions mounting said first platform on said second platform, a second pair of trunnions mounting said second platform on a stationary frame, the axes of said first and second pair of trunnions being orthogonally related, first and second torque devices mounted on said first platform and operatively coupled to said pair of gyros respectively, an antenna supported on two orthogonally related pivotal mountings for universal swivelling movement, said pivotal mountings being rotatable, one of said pivotal mountings being carried by said stationary frame, the respective axes of said pivotal mountings and said pairs of trunnions being parallel, a first pair of servo loops operatively coupled between and including one pair of trunnions and the parallel pivotal mounting, a second pair of servo loops operatively coupled between and including the other pair of trunnions and other pivotal mounting; each pair of loops comprising one high frequency responsive loop and one low frequency responsive loop; each low frequency loop comprising a first synchro operatively coupled to one of said trunnion pairs, a second synchro operatively coupled to one of said pivotal mountings, a motor also operatively coupled to the last-mentioned pivotal mounting, means electrically connecting said first synchro to said second synchro and said second synchro to said motor, error signal-generating means operatively coupled between said antenna and one of said torque devices, said error signal-generating means including an amplifier which produces a signal representative of the angular displacement of said antenna; and each high frequency loop comprising the first synchro, the second synchro and the motor and said high frequency loop being responsive to the relative motion of said stationary frame.

5. A guiding system comprising a single gyroscopic instrument which includes a first platform, a pair of gyros each mounted on said platform by a single axis pivot structure, the spin axes of said gyros normally being perpendicular to said platform, the axes of said gyros being spaced apart in normal relation, a pair of torque devices on said platform operatively connected to said pivot structures respectively, a second platform, a first pair of trunnions mounting said first platform on said second platform, a second pair of trunnions mounting said second platform on a stationary frame, the axes of said first and second pair of trunnions being orthogonally related, an antenna, a gimbal mounting said antenna on said stationary frame, said gimbal having a supporting frame which carries two orthogonally related pivotal mountings, one of said pivotal mountings connecting said supporting frame to said stationary frame, the other pivotal mounting carrying said antenna for rotation therewith, the respective axes of said pivotal mountings and said pairs of trunnions being parallel, a first pair of servo loops operatively coupled between and including one pair of trunnions and the parallel pivotal mounting, a second pair of servo loops operatively coupled between and including the other pair of trunnions and other pivotal mounting; each pair of loops comprising one high frequency responsive loop and one low frequency responsive loop; each low frequency loop comprising a first synchro operatively coupled to one of said trunnion pairs, a second synchro operatively coupled to one of said pivotal mountings, a motor also operatively coupled to the last-mentioned pivotal mounting, means electrically connecting said first synchro to said second synchro and said second synchro to said motor, error signal-generating means operatively coupled between said antenna and one of said torque devices; and each high frequency loop comprising the first synchro, the second synchro and the motor and said high frequency loop being responsive to the relative motion of said stationary frame; one of the first synchros being operatively connected between said first pair of trunnions and said second platform, the other of said first synchros being operatively connected between the second pair of trunnions and said stationary frame, one of the second synchros and one of said motors being operatively connected between said other pivotal mounting and said supporting frame, and the other of said second synchros and the other of said motors being operatively connected to the other pivotal mounting and to said stationary frame.

References Cited in the file of this patent

UNITED STATES PATENTS

| | | |
|---|---|---|
| 2,414,108 | Knowles | Jan. 14, 1947 |
| 2,426,658 | Wooldridge | Sept. 2, 1947 |
| 2,512,693 | Sparks | June 27, 1950 |
| 2,548,278 | Wirkler | Apr. 10, 1951 |
| 2,557,401 | Agins | June 19, 1951 |
| 2,732,720 | Taylor | Jan. 31, 1956 |
| 2,762,123 | Schultz | Sept. 11, 1956 |
| 2,795,379 | Dowker | June 11, 1957 |